United States Patent

Hicks et al.

[15] 3,675,493
[45] July 11, 1972

[54] GROUT EXPANSION PRESSURE METER AND METHOD FOR USING SAME

[72] Inventors: David G. Hicks, 202 Jones Valley Drive S.W., Huntsville, Ala. 35802; Lawrence P. Varner, 714 Pettus St., Selma, Ala. 36701

[22] Filed: May 4, 1970

[21] Appl. No.: 33,999

[52] U.S. Cl. ............................................. 73/432 R, 73/88 E
[51] Int. Cl. ...................................... G01l 7/00, G01d 21/00
[58] Field of Search .................. 73/88 E, 88 C, 59, 432 R, 19, 73/395

[56] References Cited

UNITED STATES PATENTS 2,568,238  9/1951  Le Van ..................................... 73/395
2,668,437  2/1954  Patch ......................................... 73/19

OTHER PUBLICATIONS

Publication: " Test For Air Content of Concrete by Pressure Method (C231)" October 1965 ASTM Standards, Vol. 10. TA401A5St. pp. 167– 169.

*Primary Examiner*—S. Clement Swisher
*Assistant Examiner*—Daniel M. Yasich
*Attorney*—Charles K. Wright, Jr., William G. Capcynski and Lawrence A. Neureither

[57] ABSTRACT

The invention relates to a grout expansion pressure meter and the method for its use. Grout containing a fluidifier is poured into a container and the pressure is measured at various time intervals by means of a pressure gage placed on the container.

2 Claims, 2 Drawing Figures

INVENTORS
DAVID G. HICKS &
LAWRENCE P. VARNER
BY Charles K Wright Jr.
ATTORNEY

3,675,493

GROUT EXPANSION PRESSURE METER AND METHOD FOR USING SAME

The invention described herein may be manufactured and used by or for the Government for governmental purposes without the payment to us of any royalty thereon.

BACKGROUND OF THE INVENTION

1. Field of the Invention

In construction work, grout containing a fluidifier expands and if a controlled amount of the fluidifier is not used, structural damage may result. The grout expansion pressure meter measures the pressure resulting from this expansion.

2. Description of the Prior Art

Even in the absence of a fluidifier Portland cement pastes and mortars expand slightly when hardened in water, owing to their colloidal nature, causing disintegration and unsoundness. A test used to measure this expansion is known as the autoclave test. A water-cement paste of normal consistency is mixed and tamped uniformly in molds. The resulting bars are stored for a period of time in moist air and then measured for initial length. The bars are then placed in an autoclave, heated to a specified temperature, removed, placed in hot water, cooled, stored, dried and measured for final length. The test is lengthy and requires a thick-walled steel cylinder autoclave with a pressurized chamber.

When cement is allowed to dry in air it usually undergoes a volumetric contraction "settlement shrinkage" rather than expansion. However, when certain additives such as aluminum powder and other types of fluidifiers are used, expansion occurs as it does when cement is hardened in water. The only field tests commonly performed on grout samples are flow tests, time setting tests and compressive strength tests, none of which measure pressure resulting from expansion.

SUMMARY OF THE INVENTION

When aluminum powder is added to concrete it reacts chemically with alkaline constituents of the cement and generates hydrogen gas which reduces separation of water and helps prevent "settlement shrinkage." The expansion of the mortar, which also results from generation of the gas, causes the mortar to fit snugly in the space which confines it making it useful where tight grout fillings are required. Extremely small amounts of the aluminum powder are necessary. For example, tests have demonstrated that a fluid grout suitable for use under machine bases requires about a teaspoonful of aluminum powder per sack of cement.

The present invention provides a method and means to measure the pressures created by expanding grout resulting from the application of a fluidifier to the grout mixture.

Accordingly, it is an object of this invention to provide a rapid uncomplicated test for measuring pressure resulting from the expanding grout.

It is a further object of the invention to provide a means to accomplish the above test.

DESCRIPTION OF THE PREFERRED EMBODIMENT

Figures 1, 2:
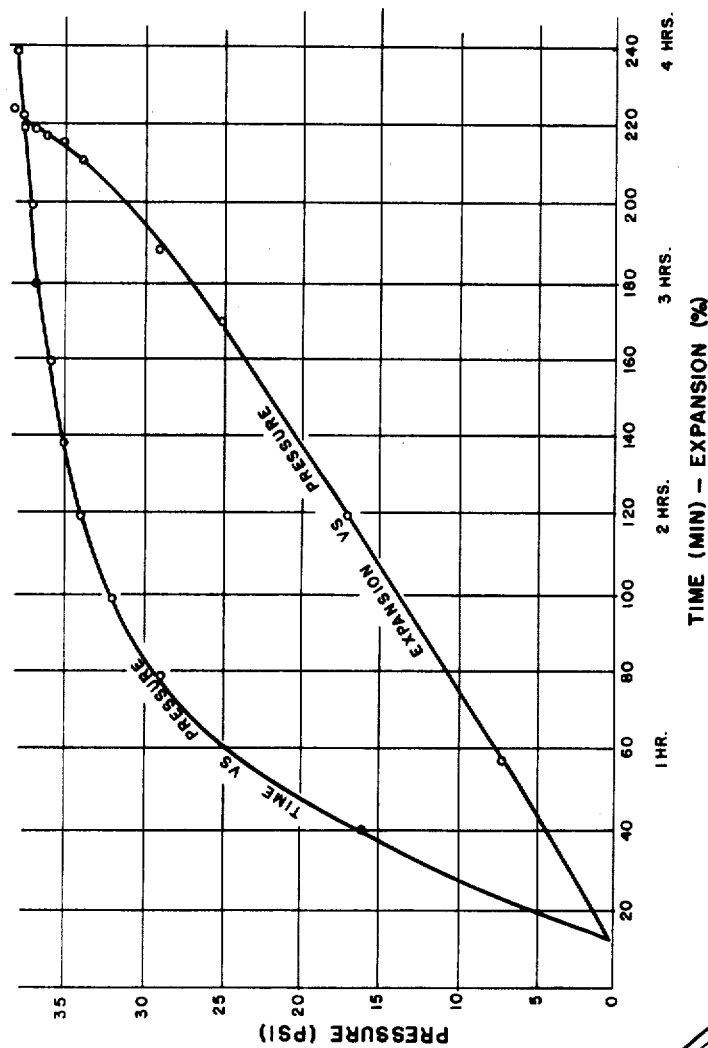
FIG. 1 shows an elevational view of the grout expansion pressure meter.
FIG. 2 is a graph illustrating pressure as functions of expansion and time.

The preferred embodiment of the grout expansion pressure meter 1 is shown in FIG. 1. The device 1 is supported by a base 2 which can be clamped or attached by other suitable means 3 to the lower pipe 7. A cap 4 sets on the base 2 and is threadably engaged over the bottom of the lower pipe 7 at 5. A reducer 10 is threadably engaged on the top of the lower pipe 7 at 9. An upper pipe 13 is threadably engaged into the top of the reducer 10 at 12. A standard pressure gage 16 is threadably engaged on the top of the upper pipe 13 and 14.

In use the pressure gage 16 is removed from the upper pipe 13. The upper pipe 13 and reducer 10 are disconnected from the lower pipe 7 which is preferably of a diameter of 3 inches or greater. A representative mixture of grout consisting of Portland cement, mineral filler, fluidifier, fine aggregate and water is poured into the lower pipe 7 until it is completely filled. The upper pipe 13 and reducer 10 are screwed onto the lower pipe and filled completely with water. The pressure gage 16 is connected and the time of installation recorded. The maximum pressure, which is the critical pressure, should be reached within the time of initial set, which can be determined from performing a test for time of setting grout mixtures.

A pressure-expansion graph may be drawn up if the expansion of the grout is measured concurrently with the pressure. Grout is poured into a 1,000 ml graduate to a specified level at the same time the grout is poured into the pressure device 1. At intervals of approximately 20 minutes the pressure gage 16 is read and the level of the grout in the graduate is measured.

The expansion is determined by calculating as follows:

$E = (V_2 - V_1 \times 100)/V_1$ where:

$E$ = expansion of grout, percent
$V_1$ = volume of graduate sample at beginning of test, ml
$V_2$ = volume of graduate sample after standing, ml Graphs, as in FIG. 2, can then be drawn showing pressure as a function of time and expansion.

We claim:

1. A method of continuously measuring pressure resulting from the expansion of grout containing a fluidifier, comprising:
    a. filling a body portion of a container with grout containing a fluidifier;
    b. filling a neck portion of said container surmounted on said body portion with liquid having an interface coextensive with the grout containing a fluidifier; and
    c. measuring pressure by means of a pressure gage surmounted on said neck portion and communicating directly with said liquid providing a continuous liquid column from said interface to said pressure gage; and
    d. recording said pressure.

2. A method of continuously measuring pressure resulting from the expansion of grout containing a fluidifier and correlating said pressure to a corresponding volumetric expansion of grout containing a fluidifier, comprising:
    a. simultaneously filling a body portion of a disassembled grout expansion meter container with grout containing a fluidifier and filling a second graduated container to a specified level with the same grout mixture;
    b. attaching a neck portion to the body portion of said grout expansion meter container and filling said neck with liquid to remove all air; and
    c. attaching a pressure gage to an open end of said neck wherein said pressure gage is located directly above a liquid level formed by said liquid filled neck portion; and
    d. simultaneously reading and recording at any given time the pressure gage of said grout expansion meter and the level of grout in said second graduated container.

* * * * *